March 23, 1943.    A. A. PAGE    2,314,423
ROTARY SEWAGE DISTRIBUTOR
Original Filed April 10, 1939    2 Sheets-Sheet 1

Inventor
Arthur A. Page
By Williamson & Williamson
Attorneys

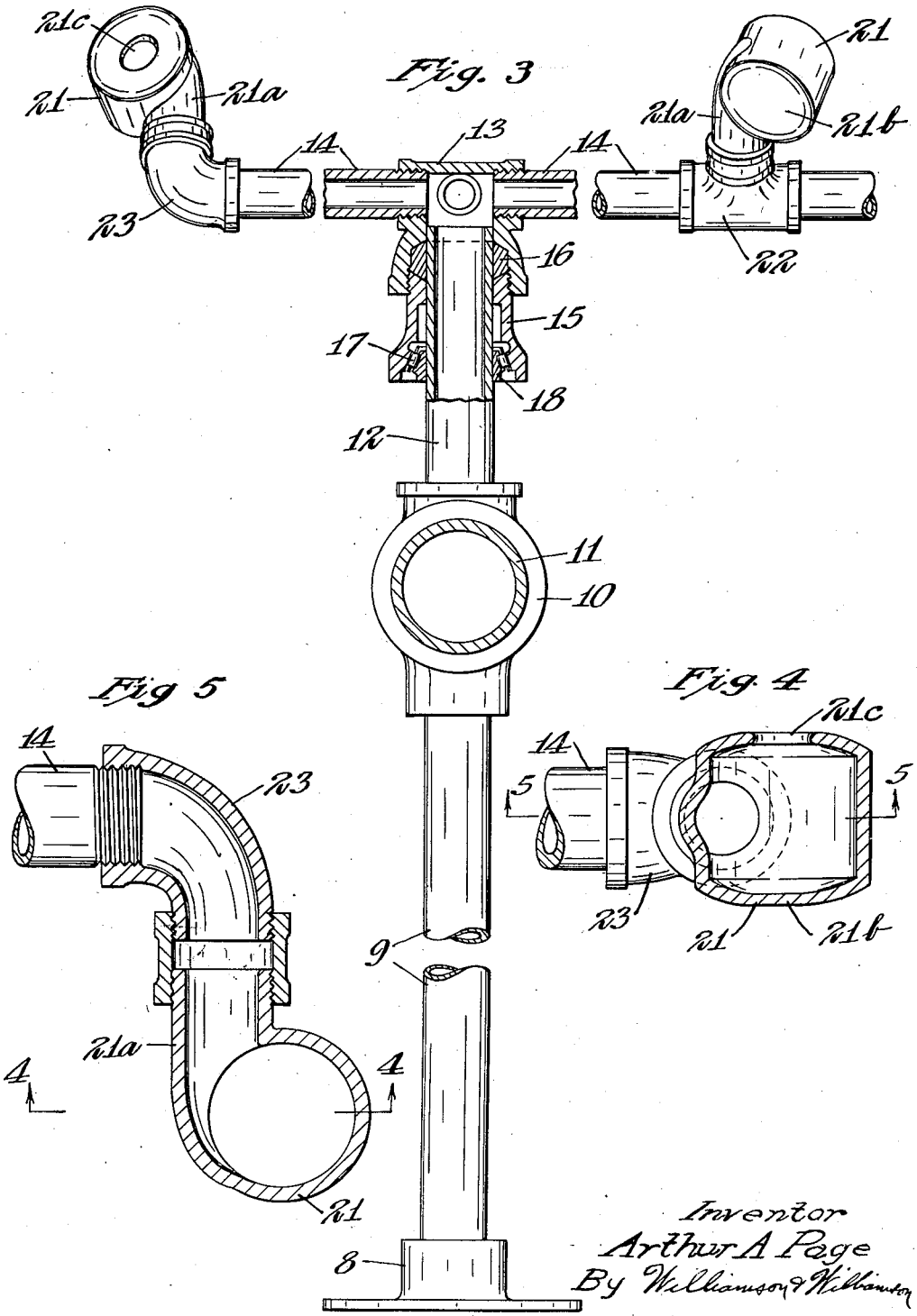

Patented Mar. 23, 1943

2,314,423

UNITED STATES PATENT OFFICE

2,314,423
ROTARY SEWAGE DISTRIBUTOR

Arthur A. Page, Red Wing, Minn., assignor by mesne assignments to Albert M. Marshall, Kansas City, Mo.

Continuation of application Serial No. 267,151, April 10, 1939, which is a continuation of application Serial No. 41,769, September 23, 1935. This application September 10, 1941, Serial No. 410,255

2 Claims. (Cl. 299—69)

This invention relates to rotary sewage distributors for use particularly in distributing sewage onto the beds of trickling filters. This application is a continuation of my prior application for patent Serial No. 267,151, filed April 10, 1939, entitled "Rotary distribution for sewage filters," which said application Serial No. 267,151 was a continuation of my earlier filed application Serial No. 41,769, filed September 23, 1935, entitled "Rotary distributor for sewage filters."

It is the general object of this invention to provide a novel and improved rotary sewage distributor which will economically, efficiently and uniformly distribute sewage onto the filter bed of a trickling filter.

More specifically it is the object of the invention to provide a rotary distributor for sewage having nozzles which will not clog and which will efficiently spray sewage in a rain like spray over a wide surface of the bed of a trickling filter and which nozzles by the reactive force of sewage passing therethrough will cause rotation of the distributor without the employment of a driving motor or some other source of power independent of the nozzles.

It has long been recognized by sewage engineers that, for economy of construction and efficiency of operation of trickling filters, sewage should be distributed uniformly over the surface of a filter bed in a rain like spray. A rain like distribution can be obtained by employing with the distributor spray nozzles such as those employed in spraying water and having small orifices or restricted orifices. Such nozzles cannot be used successfully with sewage for the reason that sewage contains large quantities of solids in suspension and greasy matter that quickly clog such nozzles necessitating frequent shut down of the distributor and constant servicing of the nozzles to clean them.

To produce a distributor having nozzles which will not readily clog it has been the common practice to provide rotary distributors having hollow radial arms equipped with outlets from which the sewage pours in solid streams onto the filter bed. And in the case of certain of such rotary distributors the reactive forces of the sewage flowing from the outlets have been used to rotate the distributor. Such distributors as last mentioned are rather economical to operate inasmuch as no motor or other independent mechanism for rotating the distributor is required and the outlets do not readily clog. However, such rotary distributors are not highly efficient for the reason that they require the use of very large filter beds which are expensive to construct inasmuch as when the sewage pours down in solid streams from the outlets the sewage does not spray evenly over the entire surface of the filter bed and the filter bed cannot be used to the same intensity as it could be if the sewage could be sprayed from the distributor over quite a wide area of the filter bed.

In the general sprinkling art fixed and non-rotating sprinkling nozzles such as those shown in the Boyer Patent No. 1,511,940 of October 14, 1924, and in the Gerding Patent No. 1,615,010 of January 18, 1927, have been used. These nozzles are of a type including a hub having a tangential inlet port, one closed end and one open end equipped with a large discharge outlet and with this type of nozzle the fluid is given a whirling action in the hub and it discharges from the discharge outlet in a tangential hollow conical spray. The whirling action prevents the nozzle from clogging inside of the hub and as the discharge outlet is large it will not clog. Such nozzles to my knowledge have not before my invention been used for distributing sewage and it has not been heretofore understood or discovered that such nozzles could be employed in connection with a rotary sewage distributor to rotate the same.

I have discovered that a highly satisfactory and efficient rotary sewage distributor equipped with spray nozzles can be produced which will uniformly spray sewage over a wide area of a filter bed in the form of a rain like spray without clogging of the distributor nozzles and while rotating the distributor by mounting such nozzles as is shown in the Boyer and Gerding patents on a rotary distributor in such a position that reactive forces are set up as the sewage is discharged from the nozzles in a direction to induce rotation of the entire head, thereby eliminating the necessity for the use of a motor or other source of power for rotating the distributor independent of the nozzles themselves and securing great economy of operation.

An embodiment of the invention is illustrated in the accompanying drawings wherein like reference characters refer to the same or similar parts throughout the various views and in which:

Fig. 3 is a view on enlarged scale taken chiefly in side elevation of the distributor, certain of the parts being broken away and shown in section;

Fig. 4 is a section taken on the line 4—4 of Fig. 5 as indicated by the arrows and showing one of the nozzles and attached parts; and Fig. 5 is a section taken substantially on the line 5—5 of Fig. 4 as indicated by the arrows.

Figure 1:
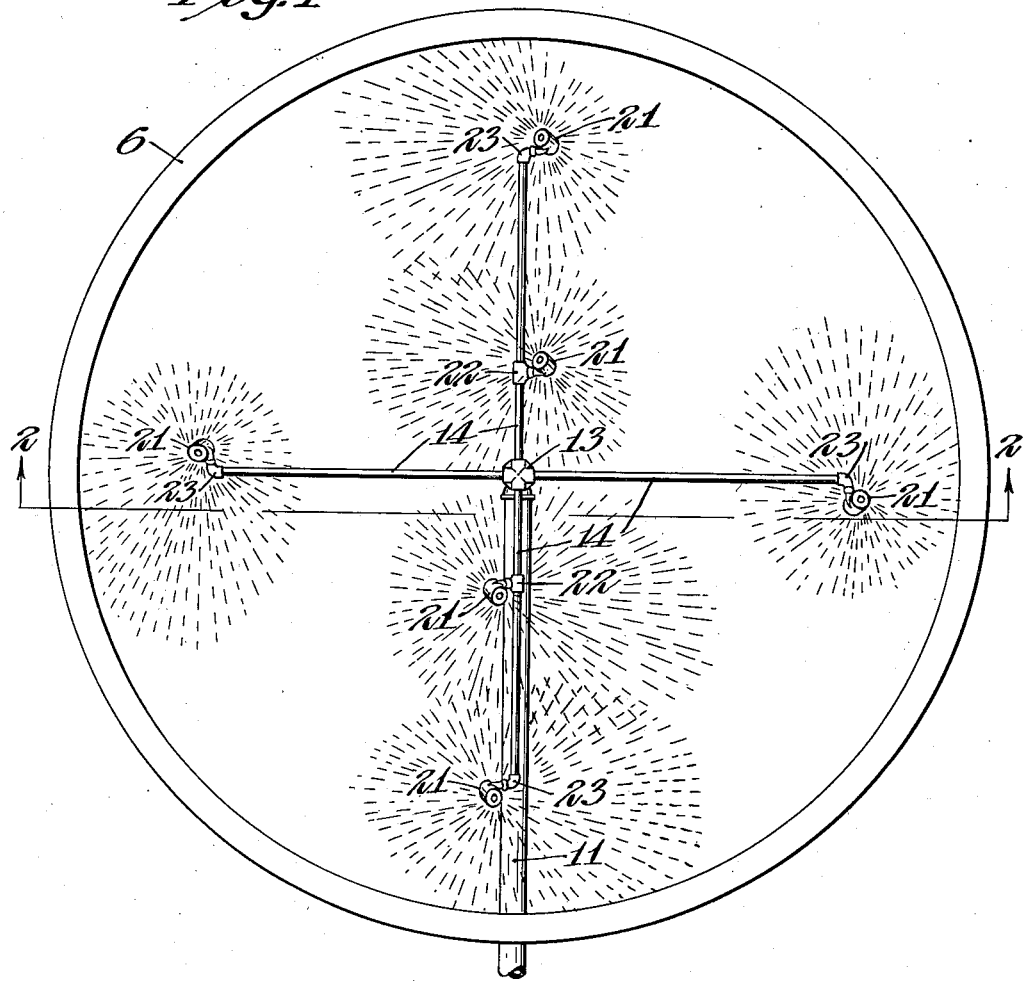
Fig. 1 is a plan view of a rotary sewage distributor embodying the invention and working over a filter bed.
Figure 2:
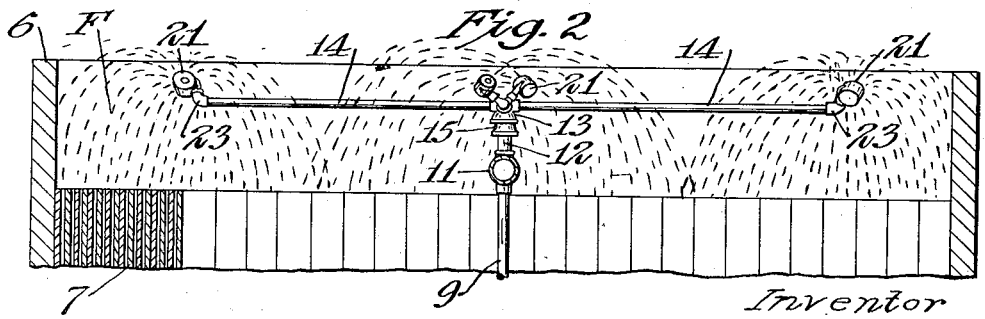
Fig. 2 is a vertical section taken on the line 2—2 of Fig. 1 as indicated by the arrows.

Referring to the drawings, there is illustrated a portion of a continuous flow type trickling filter F including a circular wall 6 within which a suitable filter medium 7 is contained the particular medium illustrated being a hollow filter tile. As is well known in the art the sewage, after such solids as can be removed therefrom by settling, is distributed over the surface of the bed formed by the filter medium 7 and it gradually trickles downwardly through the bed where it is acted on by bacteria and is clarified and purified. My sewage distributor is intended primarily for use with such a trickling filter as that typified by the filter F.

To properly support the rotary head of my sewage distributor I may provide a socket 8 which will be permanently attached at the bottom of the filter F and which may carry a supporting standard 9 rising vertically through the filter bed to emerge above the bed at the center thereof. Secured to the upper end of the standard 9 is a pipe fitting 10 to which is connected a horizontal sewage supply pipe 11 through which sewage from which most of the solids have been separated as by settling is run under pressure. The sewage supply pipe 11 communicates through the fitting 10 with a vertical upwardly extending stand pipe 12 which, of course, will be located at the center of the filter bed 7. On this stand pipe 12 a rotary distributing head 13 is mounted which carries a plurality of radial horizontally disposed hollow distributing arms 14, the said arms being preferably regularly circumferentially spaced relative to the center of the head 13. To suitably support the head 13 for rotation on the stand pipe 12, a bearing member 15 is carried by a lower or skirt part of the head 13 being screwed into the skirt. Of course, the head 13 is hollow and the bearing member 15 is annular whereby the stand pipe 12 will run through the bearing member 15 and into the lower part of the head 13 to communicate with the head. Packing 16 serves to prevent the leakage of sewage between the head 13 and the stand pipe 12. The bearing member 15 carries near its lower end a suitable roller bearing 17 which engages a roller race 18 carried by the stand pipe 12. The above described arrangement is merely one arrangement which may be provided for supporting the head 13 for free rotation over the filter bed while permitting the supply of sewage under pressure to the head.

The distributor arms 14, of course, communicate with the head 13 at their inner ends and the arms are in the form of pipes and they run outwardly in radial direction some little distance from the head 13. A multiplicity of spray nozzles 21 are carried by the various arms 14 and they are so carried as to permit of rotative adjustment of the nozzles about the longitudinal axes of the various arms as well as to permit rotative adjustment of the nozzles about axes normal to the longitudinal axes of the various arms.

In the case of nozzles 21 which are other than those located at the extreme outer ends of the arms 14 T fittings 22 are interposed between sections of the arms whereby these T fittings can be turned so that the central outlets of the T fittings are set at any desired angulation taken about the longitudinal axes of the particular arms to which these fittings are attached. In the case of the outermost nozzles 21 elbows 23 are secured to the outer ends of the arms 20 and these elbows can be swung so that the outlets therefrom extend at desired angulations taken about the longitudinal axes of the arms 20.

Each nozzle 21 as best illustrated in Figs. 4 and 5 consists of a cylindrical hub having a tangential inlet 21a running into and communicating with the cylindrical body of the hub and one end of the hub is closed by a wall 21b. The end of the hub opposite the closed end is open to provide a discharge outlet 21c of considerable size relative to the interior diameter of the hub. The outlet 21c is preferably circular and is completely unobstructed. In the illustrated embodiment, the outlet 21c is of somewhat less diameter than the interior diameter of the nozzle 21, but it is found unnecessary to make the diameter of the outlets less than the interior diameter of the hub of the nozzle. The size of the outlet 21c will be varied to suit the requirements of the particular filter in connection with which the distributor is used, the pressure at which the sewage is supplied and the position of the nozzle on the distributor which works over the filter. Thus, for example, it may be desirable to employ nozzles 21 having different size outlets 21c at the inner part of the distributor than the nozzles located at the outer part of the distributor. In the drawings two of the arms 14 are shown as being equipped with one nozzle 21 each and the two other arms are shown as being equipped with two nozzles. It is desirable to have more nozzles near the outer ends of the arms inasmuch as the outer ends of the arms travel over a greater area of the filter bed and better distribution is thus obtained. In actual practice on large distributors each arm will be equipped with a number of nozzles. The tangential inlet 21a of each nozzle is preferably connected to a nipple 19 and each nipple is screw threaded into its connecting T 22 or elbow 23. By reason of the screw threaded connection between each nipple and its connecting T or elbow, the nozzle can be turned angularly relative to the T or elbow so that the nozzle can be set at any desired angle relative to an axis extending normal to the longitudinal axis of the particular arm 14 to which the nozzle is connected.

In setting the nozzles 21 they are so disposed that the outlets 21c are at the upper ends of the nozzles and face somewhat rearwardly relative to the intended direction of rotation of the distributor. Preferably, the cylindrical hubs of the nozzles 21 will stand at somewhere between a 45° angle and a 75° angle in respect to the horizontal, tipped as shown. This angulation that is given to the nozzles is for the purpose of causing reactive forces to be set up against the closed ends 21b of the nozzles as the sewage is sprayed therefrom whereby the distributor including the head 13, arms 14, and nozzles 21 are caused to rotate relative to the stand pipe 12. The speed of rotation of the distributor can be varied by varying the tilt of the nozzles relative to the arms or by varying the tilt of at least certain of the nozzles relative to the arms. The range of spray from individual nozzles can also be varied by changing the tilt of the nozzles.

As sewage under pressure is supplied through the pipe 11 the sewage runs upwardly through the stand pipe 12 into the head 13 where it is distributed to the several radial arms 14. Some of the sewage is thrown onto the bed 7 from the inner nozzles 21 carried by the radial arms 14 while other portions of the sewage pass on to be distributed from the outer nozzles 21. The sewage running into any one of the nozzles 21 through the tangential inlet 21a is given a whirling motion and the sewage due to this whirling action keeps the interior of the nozzle clean. The sewage is ejected through the nozzle outlet 21a in tangential spray particles rather than in a solid stream. This spray forms a substantially hollow cone after it leaves the nozzle to drop onto the filter medium 7 forming the filter bed in a rain like form and to cover a wide area on the filter bed. The nozzles are so spaced on the distributor that the major part of the filter bed is constantly sprayed and as the distributor rotates every portion of the filter bed will receive a spray of sewage. The nozzles are also so located when provided in the proper quantity and location that approximately the same amount of sewage will be distributed to each portion of the filter bed during a given time period. With this arrangement it will be seen that a very efficient distribution of the sewage over the bed can be effected.

The use of the nozzles 21 to distribute sewage on a rotary distributor turning through a circular path over a circular filter bed is peculiarly beneficial to secure even distribution over that bed for a reason that it is not at once apparent. Even distribution from a rotary sewage distributor working over a circular filter bed and turning about a vertical axis at the center of the bed can be secured only if at successively greater radial distances from the center of the bed and distributor more sewage is sprayed from the distributor to cover to the same degree and intensity the successively larger zones of the bed onto which the sewage must fall and over which the distributor works. The sewage being admitted to the hub of one of my nozzles 21 through the tangential inlet 21a is, as has been stated, given a whirling action in the hub and, depending largely on the depth of the hub of the nozzle, the diameter of the hub and the side of the tangential inlet, the sewage whirls in the hub of each nozzle 21 of similar construction through a definite number of angular degrees to finally issue from the outlet 21c of the nozzle chiefly at one point so that the chief portion of the spray stream from the nozzle and the bulk of the spray stream issues from one side of the nozzle and falls at one side of the nozzle onto the filter bed. By proper adjustment of the nozzles relative to the distributor arms 14 the nozzles are turned so that their discharge points are outwardly disposed and they are thus made to discharge the bulk of their spray streams outwardly from their points of attachment to the distributor arms 14 with but relatively small parts of their spray streams discharging inwardly of the points of attachment to the nozzles of the distributor arms. There is thus an ever increasing gradation of sewage discharge from each nozzle outwardly on the bed from the point where the inner part of the spray stream from that nozzle strikes the bed to the point where the outer part of the spray stream from that nozzle strikes the bed. This gradation corresponds generally to the requirements of the circular bed so as to give to each part of the bed approximately the same amount of sewage as the distributor works over the bed. Thus the use of the nozzles 21 on a rotary distributor secure successively greater distribution of sewage radially outwardly from the center of rotation of the distributor and even distribution over the entire filter bed is thus obtained.

As has been before brought out the interiors of the hubs of the nozzles 21 are washed clean by the rotary stream of fluid passing therethrough. As the outlet openings 21c of the nozzles are large in diameter and are unobstructed it is almost impossible for the outlets of the nozzles to clog. By reason of this fact the nozzles very rarely have to be serviced and highly economical operation of the distributor is thus occasioned by reason of the peculiar nozzle construction. As the reactive forces set up against the closed ends 21b of the nozzles cause rotation of the entire distributor while the nozzles remain clear of obstruction, the filter bed is sprayed by a continuously rotating rain like spray without the necessity of the use of a motor or any other mechanism for rotating the distributor apart from the nozzles. Attention should be called to the fact that the nozzles do not merely dump the water in a solid stream onto the filter medium as is the case with many other nozzles now in use on sewage distributors. The sewage is sprayed in a fine spray onto the bed so that it is distributed over a wide area uniformly.

It will be seen that an extremely efficient sewage distributor has been provided. The simple structure and the combination of the nonclogging feature, the spray feature and the self rotational feature make this type of distributor highly successful for the purposes intended. The distributor has met with wide success in commercial installation.

It will, of course, be understood that various changes may be made in the form, details, arrangement and proportions of the parts without departure from the present invention which generally stated consists in the matter shown and described and set forth in the appended claims.

What is claimed is:

1. A sewage distributor for applying sewage to a trickling filter comprising a hollow bearing member, means for supplying sewage to said bearing member, a hollow head rotatably mounted on said bearing member and receiving sewage therefrom, a plurality of hollow distributing arms projecting outwardly from and communicating with said head, a multiplicity of circumferentially and radially spaced sprinkler nozzles each nozzle being in the form of a cylindrical hub having a tangential inlet port and one closed end and one open end equipped with an unobstructed discharge outlet and tubular articulated connecting means connecting the tangential inlet ports of said nozzles to said arms, said connecting means being rotatably adjustable about the longitudinal axes of said arms and being rotatably adjustable about axes normal to the longitudinal axes of said arms, at least certain of said nozzles being set relative to said arms at such tipped angles that reactive forces will be set up against the closed ends of said nozzles as sewage discharges therefrom to cause rotation of said head and arms and the nozzle structure being such that sewage as discharged from said nozzles will be given a centrifugal action to maintain the nozzles in clean unobstructed condition and sewage will be discharged from said nozzles over the major portion of a circular area in a rain like spray.

2. A sewage distributor for applying sewage to a circular area of a trickling filter, comprising a hollow bearing member, means for supplying sewage to said bearing member, a hollow head rotatably mounted on said bearing member and receiving sewage therefrom, a plurality of hollow distributing arms projecting outwardly from and communicating with said head, a multiplicity of sprinkler nozzles, each nozzle being in the form of a cylindrical hub having a tangential inlet port and one closed end and one open end equipped with an unobstructed discharge outlet and a multiplicity of hollow nozzle connecting means attached to and communicating with said arms at circumferentially and radially spaced points relative to the center of said head and to which connecting means the tangential inlet ports of the respective nozzles are connected, at least some of the nozzles being set by said connecting means in tipped relation relative to the vertical so that reactive forces against the closed ends of the tipped nozzles will be set up by the sewage as it is discharged from the tipped nozzles to cause rotation of said head and arms, each nozzle construction being inherently such that sewage running through the same will be given a centrifugal action to discharge in a cone-like spray chiefly in an overbalanced relation at one side of the same and said nozzles being further so set by said connecting means that the overbalanced portions of the spray discharged from at least certain of the nozzles will work chiefly outwardly and away from the center of said head to secure more even distribution over all parts of the circular area on which the spray from the distributor falls.

ARTHUR A. PAGE.